United States Patent [19]

Bowen

[11] 4,114,433

[45] Sep. 19, 1978

[54] TURNBUCKLE WRENCH FOR TENSIONING SAILBOAT MAST STAYS

[76] Inventor: Charles E. Bowen, 2701 Fairway Dr., Greensboro, N.C. 27408

[21] Appl. No.: 832,326

[22] Filed: Sep. 12, 1977

[51] Int. Cl.$^2$ .............................................. G01L 5/06
[52] U.S. Cl. ...................................... 73/143; 73/139
[58] Field of Search .................... 73/139, 143; 403/44, 403/45; 81/90 C, 90 E

[56] References Cited

U.S. PATENT DOCUMENTS

| 414,615 | 11/1889 | Walker | 73/139 |
| 1,809,087 | 6/1931 | Watrous | 73/139 X |
| 2,518,088 | 8/1950 | Spielman | 81/90 C |
| 2,536,172 | 1/1951 | Halperin | 81/90 C |
| 3,791,210 | 2/1974 | Taylor | 73/143 |

FOREIGN PATENT DOCUMENTS 411,326  8/1945  Italy ......................................... 73/139

Primary Examiner—Charles A. Ruehl
Attorney, Agent, or Firm—Joseph H. Heard

[57] ABSTRACT

The wrench is adapted to impart desired tension to mast stays which are connected to the hull of a sailboat by turnbuckle members of various different conventional constructions. As stay-tensioning rotative movement is imparted to a turnbuckle by the wrench, components of the wrench undergo progressive movement relative to each other in response to the progressively increasing resistance of the turnbuckle to rotative movement. Indicia means upon the wrench indicates the extent of the relative movement undergone between the aforesaid wrench components, and therefore indirectly indicates the degree of tension in the mast stay connected to the turnbuckle. Use of the wrench permits tension of desired magnitude to be readily and consistently imparted to each mast stay of a sailboat.

10 Claims, 4 Drawing Figures

TURNBUCKLE WRENCH FOR TENSIONING SAILBOAT MAST STAYS

BACKGROUND OF THE INVENTION

This invention relates to sailboats of the type having mast stays which are adapted to be tensioned by rotation of turnbuckle members associated therewith, and more specifically relates to a turnbuckle wrench for imparting stay-tensioning rotative movement to such turnbuckle members and for at the same time indicating the degree of tension produced in the mast stays.

Optimum performance of sailboats, particularly those of the various "class" type used for racing, can be achieved only if the boats are properly "tuned." Such "tuning" involves, among other things, tensioning of a boat's mast stays in such a manner that the tension of each stay of the boat is of an optimum desired magnitude and is properly correlated to the tension of the other mast stays. Tensioning of the stays is normally accomplished by imparting rotation in the appropriate direction to turnbuckle members by which the stays are conventionally connected to portions of the sailboat's hull. Sailboat turnbuckles are of various constructions, as a result of which a wrench suitable for applying a stay-tensioning rotative force to a turnbuckle of one construction may not be usable in connection with a turnbuckle of a different construction. For example, while a conventional open-end crescent wrench may be employed in associate with a turnbuckle of the well-known construction having a slotted main body portion of generally rectangular cross-sectional configuration, such wrench could not be employed in association with a newer type of turnbuckle, now found upon many sailboats, having a generally cylindrical main body portion through which a relatively small bore laterally extends.

Additionally, and irrespective of the means employed to impart stay-tensioning rotative movement to a particular sailboat turnbuckle, there is the problem of ascertaining the magnitude of the tension of the stay connected to such turnbuckle. As is indicated in U.S. Pat. No. 3,791,210, gauge-like devices previously proposed for this purpose have been either of a removable type attached to the stay during tensioning, and then subsequently removed, or of a second type permanently associated with the cable. Devices of the first of the aforesaid types are cumbersome to use, while devices of the second type are relatively expensive, bearing in mind the possibility of a person owning a number of sailboats each having a plurality of stays. Consequently, many "week-end" sailors still depend primarily upon only "feel" for proper tensioning of the mast stays of their boats. Such procedure is highly unreliable and frequently results, particularly with novice sailors, in improper tuning of sailboat rigging.

SUMMARY OF THE INVENTION

The present invention provides a turnbuckle wrench for readily tensioning to a desired extent the mast stays of a sailboat. The wrench is of durable and relatively inexpensive construction, but is highly effective in operation and may be used to impart stay-tensioning rotative movement to sailboat turnbuckles of various known constructions. As stay-tensioning rotative movement is imparted to a turnbuckle by the wrench, first and second lever-like components of the wrench undergo progressive relative pivotal movement in response to the increasing resistance to rotation which the turnbuckle manifests as a result of the increasing tension of the stay connected thereto. Indicia means upon the wrench indicates the extent of the relative pivotal movement undergone by the aforesaid lever-like components, and therefore indirectly indicates the magnitude of the tension produced in the mast stay connected to the turnbuckle to which rotative movement is imparted by the wrench. By observing the indicia means thereon during use of the wrench, tension of the same optimum magnitude or magnitudes may be readily imparted to each of the mast stays of a sailboat, even by a relatively inexperienced sailor, each time the boat is rigged.

DESCRIPTION OF THE DRAWING

Other features and benefits of the invention will be apparent from the following description of an illustrative embodiment thereof, which should be read in conjunction with the accompanying drawing, in which.

DESCRIPTION OF THE PREFERRED EMBODIMENT

Figure 1:
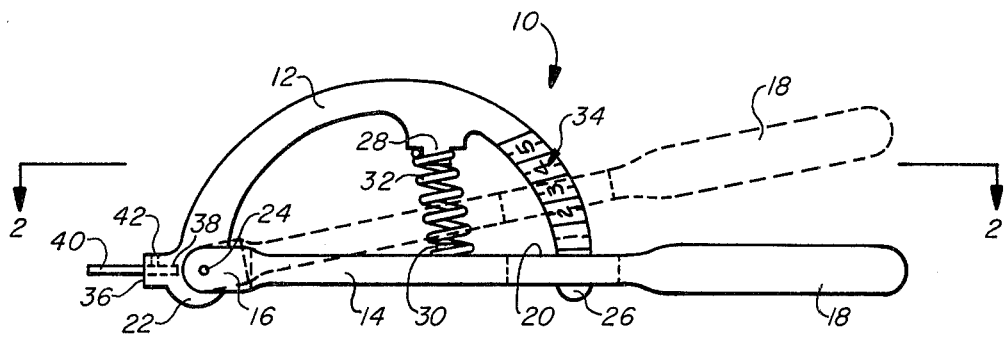
FIG. 1 is a side elevational view of a turnbuckle wrench in accordance with the invention.
Figure 2:
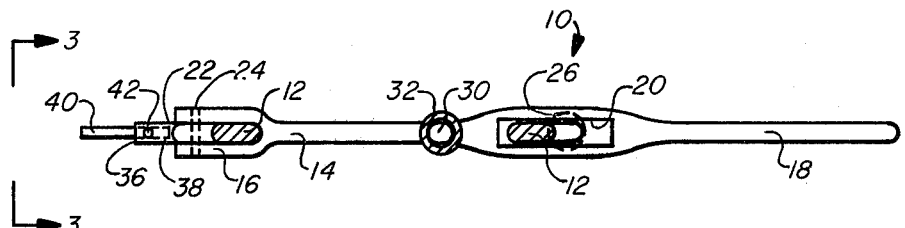
FIG. 2 is a top plan view, partially in horizontal section taken substantially along the line 2—2 of FIG. 1, of the wrench.
Figure 3:
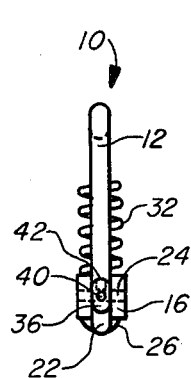
FIG. 3 is a front elevational view of the wrench.

The turnbuckle wrench identified in its entirely in FIG. 1–3 by the numeral 10 includes first and second lever-like members 12,14, respectively. Lever 14, which is substantially straight, has a bifurcated portion 16 adjacent its forward end and a handle portion 18 adjacent its rearward end. Intermediate its length an opening 20 (see FIG. 2) extends through lever 14. Lever 12, which is generally of arcuate configuration, has a rearward end portion which extends through opening 20 of lever 14, and a forward end portion 22 which is reveived within bifurcated portion 16 of lever 14. Pivot means in the form of a pin 24 extends through portions 16,22 of levers 12,14 and thus interconnects the levers for pivotal movement of levers 12,14 relative to each other. Pivotal movement of levers 12,14 relative to each other is limited in one direction by abutment of a stop member 26, carried by or (as shown) formed integrally with the rearward end portion of lever 12, with that intermediate-length portion of lever 14 through which opening 20 extends. Pivotal movement of levers 12,14 relative to each other in the opposite direction is limited by abutment of stud-like elements 28,30 respectively formed integrally with levers 12,14 intermediate the lengths thereof.

Stud elements 28,30 also serve to receive thereon and anchor opposite ends of a coil spring 32 which extends between lever members 12,14 intermediate their lengths. Spring 32 resiliently biases levers 12,14 to their relative pivotal positions shown in FIG. 1, wherein the stud-like elements 28,30 thereon are distal from each other and the stop member 26 upon the rear end of lever 12 abuts lever 14. In response to the imposition of appropriate forces upon wrench 10, spring 32 undergoes resilient axial compression and permits, as is indicated by phantom lines in FIG. 1, pivotal movement of levers 12,14 relative to each other in a direction which causes relative advancement of lever 14 away from stop member 26 of lever 12 and along that rearward section of lever 12 which extends through opening 20 of lever 14. Indicia means 34 are provided along the length of the aforesaid rearward section of lever 12, preferably on both sides thereof. By simply observing indicia means 34 and the position relative thereto of the adjacent intermediate-length portion of lever 14, a user of wrench 10 can readily ascertain the extent of the relative pivotal movement undergone by levers 12,14 at any time during use of wrench 10.

Forward end portion 22 of lever 12 has thereon a substantially flat and relatively large terminal abutment surface 36 which is disposed forwardly of bifurcated portion 16 of lever 14. An inwardly extending bore 38 is provided through the approximate center of surface 36. The axis of bore 38 is generally perpendicular to surface 36 and to the axis of the pivot pin 24 pivotally interconnecting levers 12,14. An elongate pin-like element 40 has its rearward end portion releaseably secured within bore 38 as by means of a set-screw 42. The opposite end portion of pin 40 projects forwardly from surface 36 and is adapted to be received during use of wrench 10 within a sailboat turnbuckle member, such as that designated by the numeral 44 in FIG. 4, to which stay-tensioning rotative movement is to be imparted.

Figure 4:
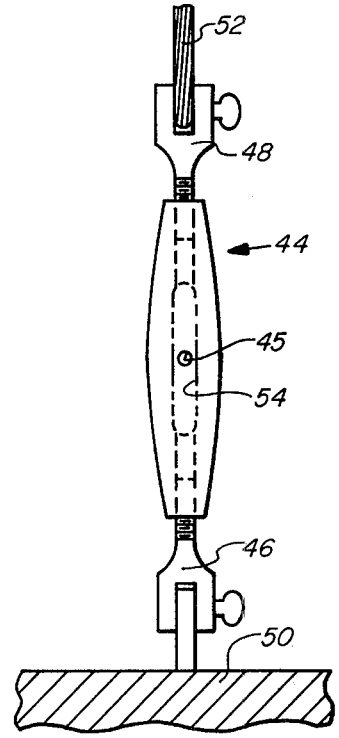
FIG. 4 is an elevational view of a sailboat turnbuckle and adjacent sailboat components of the type in association with which the wrench is adapted to be used.

Referring now to FIG. 4, the turnbuckle member 44 there shown in solid lines is illustratively of a conventional type having a generally cylindrical and substantially smooth main body portion through which a bore-like opening 45 laterally extends. At its opposite ends turnbuckle 44 has axially extending threaded bores which receive the externally threaded shanks of elements 46,48 that respectively innerconnect, in a conventional manner, turnbuckle 44 with the hull 50 of the sailboat and with one of the boat's mast stays 52. As is well known to those skilled in the art, rotation of turnbuckle 44 in the appropriate direction about its longitudinal axis effects retraction of the shanks of element 46,48 into the turnbuckle and thus imparts tension to stay 52. When wrench 10 is employed to impart the aforesaid stay-tensioning rotative movement to turnbuckle 44, pin element 40 is inserted within the turnbuckle's bore-like opening 45, preferably to such an extent that surface 36 of wrench 10 abuts the main body portion of turnbuckle 44. Such abutment insures that the leverage-effect will be the same during each usage of wrench 10. Following the aforesaid insertion of pin 40 within bore 45, stay-tensioning rotative movement is imparted to turnbuckle 44 by a user of wrench 10 moving handle portion 18 in the appropriate direction along an arcuate path of travel defining a plane perpendicular to the longitudinal axis of turnbuckle 44, while maintaining both levers 12,14 approximately within the aforesaid plane and while maintaining the central portion of lever 12 in advance of lever 14. That is, assuming that turnbuckle 44 extends substantially vertically and that clockwise rotation thereof tensions stay 52, levers 12,14 would both lie in a substantially horizontal plane and the central portion of lever 12 would be disposed in a clockwise direction in advance of lever 14 during use of wrench 10. During the first part of the stay-tensioning rotative movement thus imparted to turnbuckle 44 by wrench 10, spring 32 maintains levers 12,14 in their relative pivotal positions illustrated in FIG. 1. However, as the tension of stay 52 increases the user of wrench 10 must impose an increasingly larger force upon its handle portion 18 in order to overcome the increasing resistance of turnbuckle 44 to rotative movement. This in turn causes increasing pivotal movement of levers 12,14 relative to each other, about the axis of pivot pin 24 and as permitted by resilient compression of spring 32, as indicated by phantom lines in FIG. 1. By observing the position of lever 14 in relation to the indicia means 34 upon lever 12, the user of wrench 10 can readily ascertain the extent of the pivotal movement of levers 12,14 relative to each other. This, in turn, indirectly indicates the magnitude of the tension within the stay 52. Thus, after it has once been determined that the magnitude of the tension within stay 52 is optimum when lever 12 is aligned with, say, the numeral 3 of indicia means 34, a user of wrench 10 can be assured of obtaining optimum tension within stay 52 each time he rigs his boat simply by continuing to impart rotative movement to turnbuckle 44 until relative pivotal movement of levers 12,14 brings lever 14 into alignment with the numeral 3, and then stopping further rotative movement of the turnbuckle. The same procedure may be employed to impart tension of equal or, if desired, other magnitude to each other mast stay of the same boat, or any other boats which the wrench user might own.

Wrench 10 can be employed with equal facility, and in the same manner as described above, in association with a sailboat turnbuckle of another conventional type wherein the lateral opening through its main body portion has a slot-like configuration such as is indicated by phantom lines and by the numeral 54 in FIG. 4. A person using wrench 10 in such case would simply insert pin 40 within slot-like opening 54 of the turnbuckle of such type, rather than in the bore-like opening 45 provided within the type of turnbuckle 44 shown by solid lines in FIG. 4.

Wrench 10 can of course also be employed if desired to impart stay-loosening rotative movement to turnbuckle 44. If during such usage wrench 10 is maintained in the same orientation as that which it occupies while imparting stay-tensioning rotative movement to the turnbuckle, no deformation of spring 32 will occur due to the fact that the stop member 26 upon the rear end of lever 12 will then remain in abutting relationship with the surfaces of lever 14 immediately adjacent opening 20.

If pin 40 should become damaged during use of wrench 10, it may be readily removed simply by first loosening set screw 42 and then withdrawing the pin from bore 38. A replacement pin 40, which may be of either the same size as that shown or, if desired, of a different size, can then be inserted into bore 38 and secured in place by set screw 42.

While a preferred embodiment of the invention has been specifically shown and described, this was for purposes of illustration only, and not for purposes of limitation, the scope of the invention being in accordance with the following claims.

That which is claimed is:

1. A turnbuckle wrench for imparting desired tension to a mast stay connected to a sailboat by an elongate turnbuckle rotatable about its longitudinal axis and having an opening extending laterally therethrough, said wrench comprising:

first and second elongate lever members each having a forward end and a rearward end;

means pivotally innerconnecting said lever members adjacent said forward ends thereof;

spring means innerconnecting said lever members intermediate the lengths thereof for resiliently maintaining a predetermined pivotal positional relationship between said lever members while yieldingly permitting pivotal movement of said lever members relative to each other;

an elongate pin-like element carried by and projecting forwardly from said first lever member for reception during use of said wrench within said opening of said turnbuckle;

said second lever member having a handle portion adjacent said rearward end thereof for receiving thereon during use of said whench a manually-applied force adapted to impart stay-tensioning rotative movement to said turnbuckle; said force being transmitted from said second lever member to said pin-like element through said first lever member and through said spring means innerconnecting said lever members, and increasing magnitude of said force causing resilient yielding of said spring means and proportionally increasing pivotal movement of said lever members relative to each other;

and indicia means upon at least one of said lever members for indicating the magnitude of the relative pivotal movement undergone by said lever members as stay-tensioning rotative movement is imparted by said wrench to said turnbuckle, and for thereby indicating the magnitude of the tension imparted to said stay.

2. A wrench as in claim 1, wherein said first lever member has upon said forward end thereof an enlarged abutment surface adapted to abuttingly engage said turnbuckle during use of said wrench, and wherein said pin-like element projects forwardly from and substantially perpendicularly relative to said abutment surface.

3. A wrench as in claim 1, wherein said forward end of said first lever member has a bore therein for receiving the rearward end portion of said pin-like element; and further including releasable set-screw means for releaseably securing said pin-like element within said bore.

4. A wrench as in claim 3, wherein said opening within said turnbuckle has a bore-like configuration and said pin-like element is adapted to be closely received therewithin during use of said wrench.

5. A wrench as in claim 3, wherein said opening within said turnbuckle comprises an elongate slot extending laterally through said turnbuckle.

6. A wrench as in claim 1, wherein said second lever member has adjacent said forward end thereof a bifurcate portion within which is received a forward end portion of said first lever member; and wherein said means pivotally innerconnecting said lever members comprises a pivot pin extending through said end portions of said lever members.

7. A wrench as in claim 6, wherein said second lever member has an opening therethrough intermediate its length; and wherein said first lever member is of generally arcuate configuration and has a rearward portion projecting through said opening of said second lever member.

8. A wrench as in claim 7, wherein relative pivotal movement of said lever members varies the extent of said projection of said rearward portion of said first lever member through said opening of said second lever member; and further including a stop member upon said rear end of said first lever member adapted to limit, by engagement with said second lever member, relative pivotal movement of said lever members in one direction.

9. A wrench as in claim 8, and further including first and second stud-like elements respectively carried by said first and second lever members intermediate their lengths, said stud-like elements being adapted to limit relative pivotal movement of said lever members in a second direction.

10. A wrench as in claim 9, wherein said spring means comprises a coil spring extending between and having its opposite end portions anchored by respective ones of said stud-like elements; and wherein said indicia means is upon said rearward portion of said first lever member.

* * * * *